No. 656,070. Patented Aug. 14, 1900.
R. H. WHITE.
VEHICLE BRAKE.
(Application filed Nov. 15, 1899.)
(No Model.)
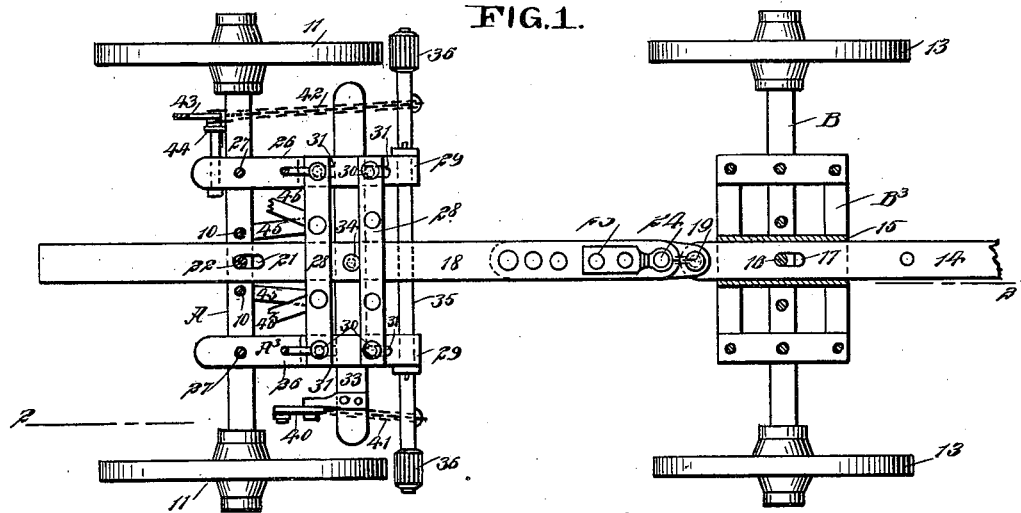

UNITED STATES PATENT OFFICE.

RUBEN H. WHITE, OF PRINCETON, KENTUCKY.

VEHICLE-BRAKE.

SPECIFICATION forming part of Letters Patent No. 656,070, dated August 14, 1900.

Application filed November 15, 1899. Serial No. 737,106. (No model.)

*To all whom it may concern:*

Be it known that I, RUBEN H. WHITE, a citizen of the United States, and a resident of Princeton, in the county of Caldwell and State of Kentucky, have invented a new and Improved Vehicle-Brake, of which the following is a full, clear, and exact description.

One object of my invention is to provide a brake especially adapted for vehicles that will be simple, convenient, durable, economic, and noiseless, and to provide a means for applying the brake automatically through the action of the team or to apply the brake by hand, if desired.

Another object of the invention is to provide a means whereby the vehicle to which the brake is applied will be propelled from behind by the rear wheels, the draft being at the rear axle and the two trucks being rigidly connected.

Another object of the invention is to provide a construction of vehicle especially adapted for use in connection with the improved brake, whereby the team will draw directly from the center of the hind axle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a horizontal section through the improved vehicle and brake mechanism, the section being taken on the line 1 1 of Fig. 2. Fig. 2 is a vertical section taken substantially on the line 2 2 of Fig. 1. Fig. 3 is a transverse section taken practically on the line 3 3 of Fig. 2. Fig. 4 is a transverse section through the roller brake-shoe employed. Fig. 5 is a longitudinal section through the said brake-shoe, and Fig. 6 is a vertical section taken practically on the line 6 6 of Fig. 2.

The forward and rear trucks of the vehicle may be of any desired construction. Preferably, however, they are made as illustrated, the rear truck comprising an axle A, an axle-bar A', and a bolster $A^2$, provided with the usual standards $a$; but under any construction employed the axle-bar A' is made to rest upon a frame $A^3$, secured to the rear axle. The bolster, axle, and axle-bar are connected by bolts 10 or their equivalents, preferably located at each side of the center of the truck, and the axle is provided with suitable wheels 11.

In the preferred construction of the forward truck an axle-bar B' is located over the axle B; but a frame $B^3$ is located between the axle-bar and axle B. Between the bolster $B^2$ and the axle-bar a second frame $B^4$ is usually provided, as shown in Fig. 6, and the bolster $B^2$ is provided with the usual standards $b$. The bolster $B^2$, upper frame $B^4$, axle-bar B', and axle B are connected by suitable bolts 12, and the axle is provided with ground-wheels 13. The tongue or pole 14 is held to slide transversely of the forward axle B within a guide-plate 15, located between the axle B and axle-bar B', as shown in Figs. 1 and 6. Where the pole or tongue 14 crosses the forward axle B, a longitudinal slot 17 is provided, (shown best in Figs. 1 and 2,) and the king-bolt 16 is made to pass through this slot 17 in said tongue or pole and through the main portions of the forward truck. The pole or tongue 14 extends beyond the rear surface of the forward truck a desired distance and is pivotally connected with the forward end of a reach 18, said connection being usually made by passing a pin 19 through a strap 20, attached to the reach, and through the rear end of the tongue or pole 14, as shown in Figs. 1 and 2. The rear portion of the reach 18 extends across the central portion of the rear axle A, as shown in Fig. 1, and where the reach 18 crosses the axle A the reach is provided with a longitudinal slot 21. A pin 22 is passed through the bolster $A^2$, axle-bar A', and the rear axle A, and likewise through the rear slot 21 in the reach. Thus it will be observed that the reach and pole combinedly have limited sliding movement on the two axles.

The forward and rear bolsters are rigidly connected by means of one or more side-boards C, so that the draft is directly from the rear axle and the wheels on the rear axle therefore tend to push forward the wheels of the forward axle when the team draws upon the pole.

A bracket 23 is secured upon the upper face of the reach 18, near its forward end, and a pin 24 is passed through the bracket into the reach, while a chain 25 is attached to the pin and to the king-bolt 16, this chain serving to prevent the king-bolt from accidentally leaving its seat.

The frame $A^3$ provided for the rear truck consists of two longitudinal parallel bars 26, located one at each side of the center of the rear axle A, as is best shown in Fig. 1, and the said bars extend forwardly quite a distance. The said longitudinal bars 26 are connected by cross-bars 28, secured to the upper faces of the longitudinal bars, the reach 18 having movement below the said frame $A^3$. A shoe 29 is located upon the under face of each longitudinal bar 26 of the fixed frame $A^3$, and the shoes have limited longitudinal movement on the fixed frame $A^3$ by reason of fastening-bolts 30 for the shoes, being passed through slots 31, made in the shoes. Each shoe is provided between its ends, in its upper face, with a recess 32, as shown best in Fig. 2, and a cross-bar 33, attached to the reach by a suitable bolt 34, extends through the recesses 32 in the shoes. Said recesses 32 are of sufficient length to permit the cross-bar 33 to have a certain amount of forward and rearward movement.

A brake-shaft 35 is journaled in any suitable manner in the forward ends of the sliding shoes 29, and a brake-shoe 36 is mounted to turn upon each outer end of the shaft 35. These brake-shoes are located in front of the rear wheels 11 and are preferably provided with a longitudinally-ribbed peripheral surface, since the brake-shoes 36 are of cylindrical form.

Upon backing the team the reach will be carried rearward and the brake-shoes will be brought in engagement with the rear wheels in an effective manner; but it is often times desirable to back the vehicle without simultaneously applying the brakes. To that end a lever 37 is fulcrumed upon one of the sideboards C, and this lever is provided with a thumb-latch 38, adapted for engagement with a rack $38^a$. A link 39 is pivoted to the lever 37 and is likewise pivotally attached to the upper end of a lever-arm 40, that is pivoted between its ends in a suitable support located at and attached to the rear of one end portion of the cross-bar 33, as shown in Figs. 1 and 2. A chain 41 is attached to the lower end of the lever-arm 40, and said chain is carried under the brake-shaft 35 and is attached to the forward portion of said shaft. Upon moving the brake-lever 37 downward and rearward the brake-shoes 36 may be carried away from the rear wheels 11 a distance greater than the possible length of movement of the reach and tongue, so that when the vehicle is backed the brake-shoes will not act on the wheels, and by carrying the lever 37 upward and forward the brake-shoes 36 may be so placed relative to the rear wheels that while normally free from engagement with said wheels the rearward movement of the pole and reach will immediately bring the brake-shoes in contact with the wheels.

It is frequently desirable to operate the brake by hand, and this can be accomplished, no matter how far removed the brake-shoes may be from the rear wheels 11, by attaching a chain 42 to the front of the brake-shaft 35 at the end opposite that at which the chain 41 is secured; but the chain 42 is carried upward and over the brake-shaft 35 and rearward to an engagement with an angle hand-lever 43, pivoted in suitable straps 44, attached to the rear axle and axle-bar, the brake-lever being likewise pivoted in the adjacent longitudinal bar of the fixed frame $A^3$. Thus by moving the hand-lever 43 rearward the brake-shaft will be drawn in the same direction, and the shaft will at the same time be revolved to a greater or less extent, thus causing the chain 41 to wind on the shaft 35 and draw the opposite end of the shaft likewise rearward.

It is obvious that the rearward movement of the brake-shaft 35 is permissible by reason of the shoes in which the shaft is mounted having sliding movement upon the fixed frame $A^3$. Braces 45 extend from the axle A to the under side of the rear cross-bar 28 of the fixed frame $A^3$, and other braces 46 extend from said cross-bar 28 to the axle-bar A'.

Having thus described my invention, I claim as new and desire to secure by Letters Patent—

1. In a vehicle, a forward and a rear axle, a reach having sliding movement on the rear axle, said reach being provided with a slot, and a pin passed through the slot into the axle, a pole or tongue pivotally attached to said reach, the pole or tongue being mounted to slide on the forward axle and having a slot therein, and a pin passed through the slot into said forward axle, as described.

2. In a vehicle, a forward and a rear axle, and a rigid connection between the axles, a reach held to slide upon the rear axle, and having a longitudinal slot therein, a pin passed through the slot into the rear axle, a pole or tongue mounted to slide on the forward axle and connected with the reach, the pole or tongue having a slot therein, and a pin passed through the slot into the forward axle.

3. In a vehicle, the combination, with the forward and the rear axles, a fixed frame attached to the rear axle, a reach having sliding movement upon the rear axle, a pole connected with the reach and having sliding movement on the forward axle, both the pole and reach having longitudinal slots therein over the axles, and pins passed through the slots and into the axles, of a brake-bar, a sliding support for the brake-bar, and a connection between the reach and said sliding supports, whereby said supports may be moved by said reach, as described.

4. In a vehicle, the combination, with the forward and the rear axles, a fixed frame attached to the rear axle, a reach having sliding movement upon the rear axle, a pole connected with the reach and having sliding movement on the forward axle, both the pole and reach having longitudinal slots therein over the axles, and pins passed through the slots and into the axles, of a bed rigidly connecting the axles, a brake-shaft, supports for said brake-shaft held to slide upon said frame, said brake-shaft being provided with brake-shoes mounted to revolve, and a connection between the reach and the supports for the brake-shaft, a shifting lever, and a connection between the shifting lever and the brake-shaft, for the purpose set forth.

5. In a vehicle, the combination, with the forward and rear axles, a reach having limited movement upon the rear axle, a pole connected with the reach and having limited movement upon the forward axle, a brake-shaft, sliding supports for said brake-shaft, and a connection between the reach and said sliding supports, of a shifting lever, a lever-arm carried by the connecting medium between the reach and the sliding supports for said brake-shaft, a connection between the lever-arm and shifting lever, and a chain connection between the lever-arm and the brake-shaft, said chain being passed below the brake-shaft to the front, a hand-lever located at the rear of the brake-shaft at the side opposite that near which the lever-arm is located, and a chain attached to the hand-lever, said chain being carried over the brake-shaft to the front thereof, as described.

RUBEN H. WHITE.

Witnesses:
W. B. TERRY,
S. HODGE.